(12) United States Patent  
Kojima et al.

(10) Patent No.: US 6,183,137 B1  
(45) Date of Patent: Feb. 6, 2001

(54) BEARING STRUCTURE

(75) Inventors: Akira Kojima; Nobutaka Hiramatsu; Mitsuru Sugita; Akira Ono; Takayuki Shibayama; Yukitoshi Ogawa, all of Nagoya (JP)

(73) Assignees: Daido Metal Company; Aichi Machine Industry So., Ltd., both of Nagoya (JP)

(*) Notice: Under 35 U.S.C. 154(b), the term of this patent shall be extended for 0 days.

(21) Appl. No.: 09/391,600

(22) Filed: Sep. 8, 1999

(30) Foreign Application Priority Data

Sep. 29, 1998 (JP) .................................................. 10-293046

(51) Int. Cl.[7] ..................................................... F16C 33/20

(52) U.S. Cl. ......................... 384/297; 384/908; 384/909; 384/911; 384/913

(58) Field of Search .................................. 384/297, 909, 384/913, 911, 908

(56) References Cited

U.S. PATENT DOCUMENTS 4,717,268 * 1/1988 Orkin .................................... 384/280  
5,067,214 * 11/1991 Hosmer et al. ....................... 384/297

FOREIGN PATENT DOCUMENTS 2232679   12/1990  (GB).  
2274844    8/1994  (GB).  
2337306   11/1999  (GB).  
57-074153   5/1982  (JP).

* cited by examiner

*Primary Examiner*—Lenard A. Footland  
(74) *Attorney, Agent, or Firm*—Browdy And Neimark

(57) ABSTRACT

A bearing structure with a low coefficient of friction and a distinguished wear resistance is obtained by coating a shaft with a resin composition comprising PAI and 5 to 50% by weight of PTFE, based on total resin composition and/or coating a bearing with a resin composition comprising PEEK and not more than 50% by weight of PTFE, based on total resin composition. By adding potassium titanate whiskers or a lead compound to the bearing resin composition, more improved coefficient of friction and wear resistance are obtained.

15 Claims, 2 Drawing Sheets

BEARING STRUCTURE

BACKGROUND OF THE INVENTION

1. Field of the Invention

The present invention relates to a bearing structure, which comprises a shaft and a bearing for supporting the shaft, the shaft and the bearing having a resin layer formed on the respective sliding surfaces.

2. Related Art

Bearings having a resin layer formed on their sliding surfaces by coating are well known, and it is also well known that addition of polytetrafluoroethylene (which will be hereinafter referred to as PTFE) to the resin can reduce the coefficient of friction and also can improve the wear resistance, but their development has been based on a bearing structure comprising a metallic shaft and a resin-coated bearing.

Recent bearings have a tendency to be used in a severer condition, therefore they are required to have bearing structures with a higher wear resistance, etc. However, bearings having the resin layer on the sliding surfaces still have such problems as an unsatisfactory wear resistance and easy wear.

SUMMARY OF THE INVENTION

The present inventors have found that further reduction in the coefficient of friction and further improvement of wear resistance can be attained by coating both of the shaft sliding surface and the bearing sliding surface with resin and adding a specific amount of PTFE to the resin, and have established the present invention.

The first aspect of the present invention provides a bearing structure, which comprises a shaft and a bearing for supporting the shaft, the shaft and the bearing having a resin layer formed on the respective sliding surfaces, the resin layer on the shaft sliding surface being made from a resin composition comprising at least one member selected from the group consisting of epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin and 5 to 50% by weight of PTFE based on total resin composition, and the resin layer on the bearing sliding surface being made from at least one member selected from the group consisting of epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin and not more than 50% by weight of PTFE based on total resin composition.

DETAILED DESCRIPTION OF THE INVENTION

The resin for use in the resin layer on the shaft and bearing sliding surfaces includes, for example, epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin, which are all distinguished in wear resistance.

In the ordinary bearing structure, shaft exchange is hard to be made, whereas bearing exchange is easy to be done. Thus, it is desired to make the wear resistance of shaft sliding surface higher than that of bearing sliding surface, thereby making the wear rate of shaft sliding surface as low as possible. To this effect, it is desirable that the resin layer on the shaft sliding surface is made from a thermosetting resin having a high hardness and that on the bearing sliding surface from a thermoplastic resin having a relatively low hardness and a low friction property (the second aspect of the present invention).

The thermosetting resin for use in the resin layer on the shaft sliding surface includes, for example, epoxy resin, phenol resin, polyamideimide resin and polyimide resin. When at least one of these resins contains PTFE, the friction resistance can be lowered and the wear resistance can be improved. Less than 5% by weight of PTFE, no satisfactory effects can be obtained, whereas more than 50% by weight of PTFE the wear resistance is lowered on the contrary. Thus, the PTFE content must be 5 to 50% by weight and particularly a content of 10 to 30% by weight thereof is preferable because of their more remarkable effects.

The thermoplastic resin for use in the resin layer on the bearing sliding surface includes, for example, polyacetal resin, polyamide resin, polyphenylene sulfide resin, polyether ether ketone resin, thermoplastic polyamideimide resin, thermoplastic polyimide resin and tetrafluoroethylene-perfluoroalkylvinyl ether copolymer resin. When at least one of these resins contains PTFE, the friction resistance can be further lowered and the wear resistance can be improved. More than 50% by weight of PTFE the wear resistance is lowered on the contrary. Thus, the PTFE content must be not more than 50% by weight, and particularly a content of 10 to 30% by weight thereof is preferable because of their more remarkable effects.

When the shaft or the backing metal of bearing is made of a metal, and the resin may be bonded directly to the shaft or the bearing surface, the bonding force between the shaft or the bearing surface and the resin is not satisfactory in some cases. As disclosed in JP-A-57(1982)-74153, it has been already established as a technique to set a metallic mesh or bronze powder to the backing metal surface of the bearing by sintering and cover the metallic mesh or bronze powder layer with a resin by filling or impregnation, thereby assuring the bonding force. This means that, for further improvement of bearing sliding surface, it will be possible to use various means, for example, addition of a lead compound to the resin layer (the fourth aspect of the present invention), addition of short fibers, such as potassium titanate whiskers (the third aspect of the present invention), etc., and a solid lubricant, etc., thereby further improving the coefficient of friction and wear resistance.

On the other hand, application of such means to the shaft sliding surface is generally difficult, except for ordinary mere spraying or coating of the resin. If the bonding force between the shaft sliding surface and the resin layer can be improved, it will be also possible to add a solid lubricant or additives such as short fibers, etc., for example, potassium titanate whiskers, etc. to the resin layer on the shaft sliding surface. Therefore a thermosetting resin having superior bonding force is preferably used for the resin on the shaft (the second aspect of the present invention).

Preferable application example of a bearing structure comprising the shaft and the bearing is an application to a continuously variable transmission (the fifth aspect of the present invention).

According to the first aspect of the present invention, a bearing structure comprises a shaft and a bearing for supporting the shaft, the shaft and the bearing having a resin layer formed on the respective sliding surfaces, where the resin layer on the shaft sliding surface is made from a resin composition comprising at least one member selected from the group consisting of epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin and 5 to 50% by weight of PTFE based on the total resin composition, and the resin layer on the bearing sliding surface is made from at least one member selected from the group consisting of epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin and not more than 50% by weight of PTFE based on the total resin composition. The bearing structure can be given a lower coefficient of friction and a distinguished wear resistance thereby.

According to the second aspect of the present invention, the resin layer on the shaft sliding surface is made from a thermosetting resin, and the resin layer on the bearing sliding surface is made from a thermoplastic resin in the bearing structure according to the first aspect of the present invention. Particularly the resin layer on the shaft sliding surface in the bearing structure can be a more improved wear resistance thereby.

According to the third aspect of the present invention, the resin layer on the bearing sliding surface contains 5 to 30% by weight of potassium titanate whiskers in the bearing structure according to the first or second aspect of the present invention. The bearing structure can be given a much lower coefficient of friction and a much improved wear resistance thereby.

According to the fourth aspect of the present invention, the resin layer on the bearing sliding surface contains 0.1 to 10% by weight of a lead compound in the bearing structure according to the first, second or third aspect of the present invention. The bearing structure can be given a much lower coefficient of friction and a much improved wear resistance thereby.

According to the fifth aspect of the present invention, the bearing structure according to the first, second, third or fourth aspect of the present invention is applied to the bearing structure of a continuously variable transmission. A continuously variable transmission can be given a distinguished endurance thereby.

DESCRIPTION OF PREFERRED EMBODIMENTS

Figure 1:
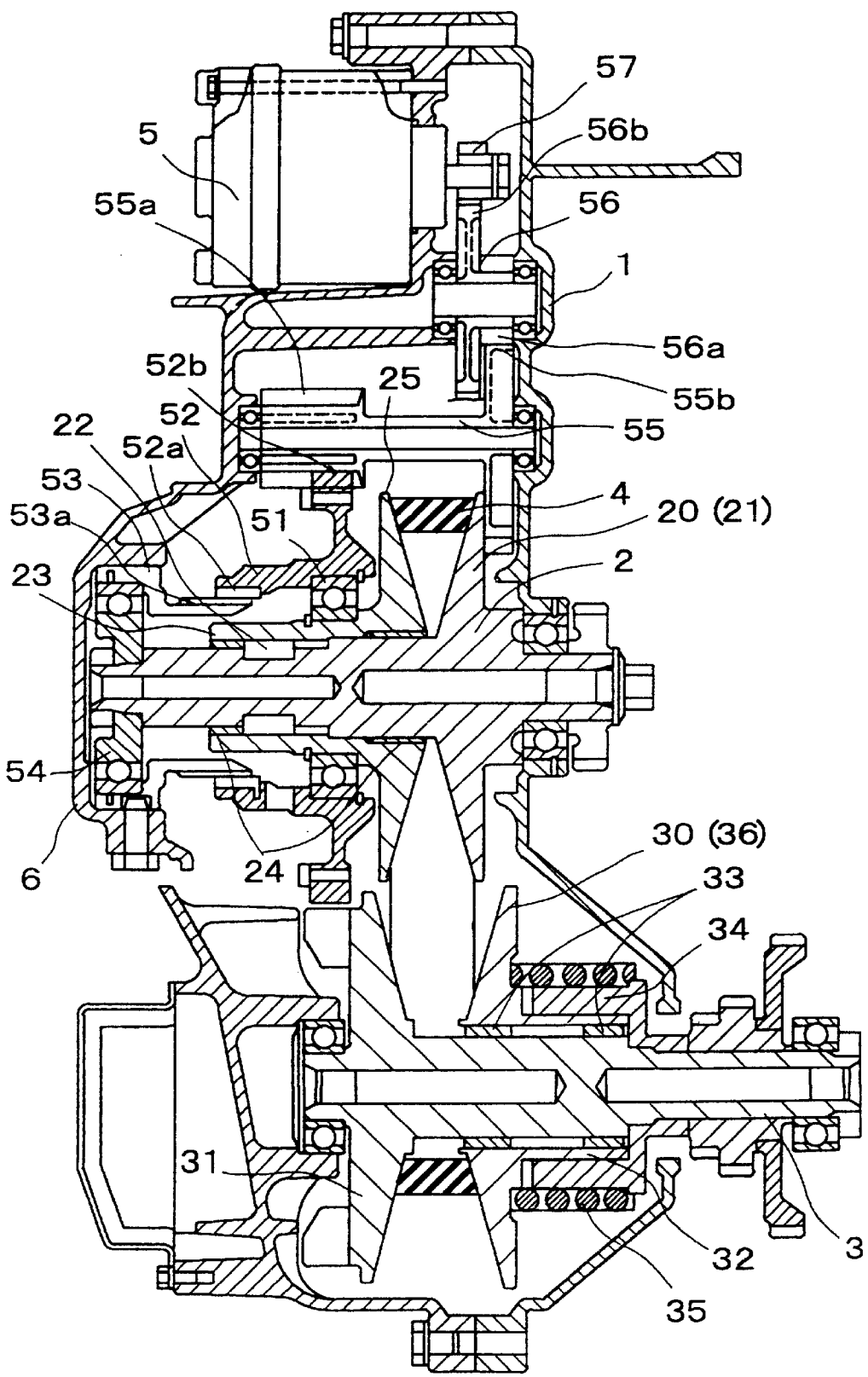
FIG. 1 is a cross-sectional view of a continuously variable transmission.

Examples of the present invention as applied to a sliding bearing will be described below, together with Comparative Examples.

At first, test pieces of bearings and shafts used in Examples 1 to 24 and Comparative Examples 1 to 11 given in Tables 1 and 2 were prepared.

Bearing test pieces were prepared in the following manner:

Bronze powder was spreaded onto a 1.5 mm-thick copper-plated steel sheet to a thickness of 0.4 mm, followed by sintering to form a porous sintered layer.

Separately, a 0.5 mm-thick resin sheet was formed from resin pellets of uniform composition given in Table 1 by a sheet extruder, and then laid onto the porous sintered layer while heating the porous sintered layer at 400° to 450° C., followed by pressure welding between rolls to conduct impregnation coating. Then, the steel sheet was cut into thrust washers, 27.2 mm in outer diameter and 22 mm in inner diameter, which were used as bearing test pieces of Examples 1 to 24 and Comparative Examples 1 to 11.

Shaft test pieces were prepared in the following manner:

Resin of the composition of one of Examples 1 to 24 and Comparative Examples 1 to 11 given in Tables 1 and 2 was sprayed onto the sliding surface of a hardened S55C steel shaft having a diameter which corresponds to the inner diameter of the thrust washer, followed by heating, thereby forming a resin layer having a thickness of 0.01 mm. In this manner, shaft test pieces of Examples 1 to 24 and Comparative Examples 1 to 11 were obtained.

Combinations of the shaft test pieces and bearing test pieces, as given in Examples 1 to 24 and Comparative Examples 1 to 11, were tested under a constant load of 10 Mpa and at a peripheral speed of 0.05 m/s for 4 hours by a Suzuki friction-wear tester to determine coefficients of friction and wear losses. The results are shown in Table 3.

TABLE 1

| Example No. | Composition of resin layer on shaft sliding surface | | | | Composition of resin layer on bearing sliding surface | | | | | | |
|---|---|---|---|---|---|---|---|---|---|---|---|
| | | | | | Thermoplastic | | | | Potassium titanate | | |
| | PAI | EP | PFA | PTFE | PEEK | PI | PPS | PTFE | whiskers | PbO | PbF$_2$ |
| 1 | 90 | | | 10 | 85 | | | 15 | | | |
| 2 | 80 | | | 20 | 85 | | | 15 | | | |
| 3 | 70 | | | 30 | 85 | | | 15 | | | |
| 4 | 60 | | | 40 | 85 | | | 15 | | | |
| 5 | 50 | | | 50 | 85 | | | 15 | | | |
| 6 | 90 | | | 10 | 100 | | | 0 | | | |
| 7 | 70 | | | 30 | 100 | | | 0 | | | |
| 8 | 50 | | | 50 | 100 | | | 0 | | | |
| 9 | 90 | | | 10 | 70 | | | 30 | | | |
| 10 | 70 | | | 30 | 70 | | | 30 | | | |
| 11 | 50 | | | 50 | 70 | | | 30 | | | |
| 12 | | 70 | | 30 | 85 | | | 15 | | | |
| 13 | | | 70 | 30 | 85 | | | 15 | | | |

TABLE 1-continued

| Example No. | Composition of resin layer on shaft sliding surface | | | | Composition of resin layer on bearing sliding surface | | | | | | |
|---|---|---|---|---|---|---|---|---|---|---|---|
| | PAI | EP | PFA | PTFE | PEEK | PI | PPS | PTFE | Potassium titanate whiskers | PbO | PbF$_2$ |
| 14 | | 50 | | 50 | 85 | | | 15 | | | |
| 15 | 70 | | | 30 | | 85 | | 15 | | | |
| 16 | 70 | | | 30 | | | 85 | 15 | | | |
| 17 | 80 | | | 20 | 80 | | | 15 | 5 | | |
| 18 | 80 | | | 20 | 75 | | | 15 | 10 | | |
| 19 | 80 | | | 20 | 65 | | | 15 | 20 | | |
| 20 | 80 | | | 20 | 55 | | | 15 | 30 | | |
| 21 | 80 | | | 20 | 70 | | | 15 | 10 | 5 | |
| 22 | 80 | | | 20 | 74 | | | 15 | 10 | | 1 |
| 23 | 80 | | | 20 | 70 | | | 15 | 10 | | 5 |
| 24 | 80 | | | 20 | 65 | | | 15 | 10 | | 10 |

TABLE 2

| Example No. | Composition of resin layer on shaft sliding surface | | | | Composition of resin layer on bearing sliding surface | | | | | | |
|---|---|---|---|---|---|---|---|---|---|---|---|
| | PAI | EP | PFA | PTFE | PEEK | PI | PPS | PTFE | Potassium titanate whiskers | PbO | PbF$_2$ |
| 1 | 100 | | | 0 | 100 | | | 0 | | | |
| 2 | 100 | | | 0 | 85 | | | 15 | | | |
| 3 | 100 | | | 0 | 70 | | | 30 | | | |
| 4 | 100 | | | 0 | 65 | | | 35 | | | |
| 5 | 92 | | | 8 | 100 | | | 0 | | | |
| 6 | 15 | | 85 | | 100 | | | 0 | | | |
| 7 | 15 | | 85 | | 85 | | | 15 | | | |
| 8 | No resin layer | | | | 100 | | | 0 | | | |
| 9 | " | | | | 85 | | | 15 | | 0 | |
| 10 | " | | | | 70 | | | 30 | | | |
| 11 | " | | | | 65 | | | 35 | | | |

TABLE 3

| | | Shaft wear loss (μm) | Bearing wear loss (μm) | Coefficient of friction | Simulation test (Hrs) |
|---|---|---|---|---|---|
| Example No. | 1 | 5 | 7 | 0.10 | 100 |
| | 2 | 4 | 5 | 0.09 | 108 |
| | 3 | 4 | 2 | 0.07 | 110 |
| | 4 | 5 | 2 | 0.06 | 100 |
| | 5 | 6 | 2 | 0.06 | 95 |
| | 6 | 6 | 11 | 0.12 | 88 |
| | 7 | 6 | 9 | 0.10 | 93 |
| | 8 | 7 | 8 | 0.08 | 85 |
| | 9 | 5 | 6 | 0.07 | 105 |
| | 10 | 5 | 7 | 0.05 | 112 |
| | 11 | 6 | 7 | 0.04 | 92 |
| | 12 | 5 | 2 | 0.06 | 106 |
| | 13 | 7 | 2 | 0.05 | 97 |
| | 14 | 8 | 3 | 0.06 | 86 |
| | 15 | 4 | 3 | 0.09 | 109 |
| | 16 | 4 | 6 | 0.09 | 101 |
| | 17 | 2 | 4 | 0.07 | 115 |
| | 18 | 2 | 3 | 0.06 | 120 |
| | 19 | 2 | 3 | 0.06 | 118 |
| | 20 | 3 | 4 | 0.06 | 110 |
| | 21 | 2 | 2 | 0.05 | 125 |
| | 22 | 1 | 3 | 0.05 | 122 |
| | 23 | 1 | 2 | 0.04 | 127 |
| | 24 | 2 | 3 | 0.04 | 121 |
| Comp. Example No. | 1 | 14 | 23 | 0.31 | 63 |
| | 2 | 13 | 14 | 0.11 | 76 |
| | 3 | 11 | 8 | 0.11 | 70 |
| | 4 | 11 | 14 | 0.10 | 78 |
| | 5 | 14 | 16 | 0.18 | 72 |
| | 6 | 20 | 10 | 0.04 | 68 |
| | 7 | 19 | 3 | 0.04 | 70 |
| | 8 | 0 | 47 | 0.41 | 13 |
| | 9 | 0 | 19 | 0.16 | 70 |
| | 10 | 0 | 23 | 0.13 | 62 |
| | 11 | 0 | 30 | 0.13 | 50 |

Comparative Examples 8 to 11 with no resin layer on the shaft sliding surface each show higher coefficients of friction and larger bearing wear loss. At 15% by weight of PTFE (Comparative Example 9) or higher in the resin layer on the bearing sliding surface the coefficient of friction is not remarkably reduced. Bearing wear loss of Comparative Example 9 is minimum, whereas at 30 and 35% by weight of PTFE (Comparative Examples 10 and 11, respectively) the bearing wear loss is larger than that of Comparative Example 9 on the contrary.

Comparative Examples 1 to 4 with no PTFE in the resin layer on the shaft sliding surface each show larger wear loss on both shaft and bearing sliding surfaces. At 15% by weight of PTFE (Comparative Example 2) or higher in the resin layer on the bearing sliding surface the coefficient of friction is not remarkably reduced. Bearing wear loss is the minimum at 30% by weight of PTFE in the resin layer on the bearing sliding surface (Comparative Example 3), where it is larger at 35% by weight of PTFE (Comparative Example 4) than that of Comparative Example 3. On the other hand the shaft wear loss is 11 $\mu$m at 30% by weight of PTFE in the resin layer on the bearing sliding surface.

Examples 6 to 8 with no PTFE in the resin layer on the bearing sliding surface each show smaller coefficients of friction, and also show smaller wear losses on both shaft and bearing sliding surfaces than that of Comparative Example 1. Thus, the effect of PTFE contained in the resin layer on the shaft sliding surface is observable. The coefficient of friction is lowered with increasing content of PTFE in the resin layer on the shaft sliding surface, but at 10% by weight of PTFE (Example 6) or higher the improvement effect of the contained PTFE is not so remarkable, as compared with Comparative Example 1 containing no PTFE also in the resin layer on the shaft sliding surface. The wear loss does not change so remarkably and shows substantially the same value as 6 $\mu$m or 7 $\mu$m even against changing PTFE content from 10 to 50% by weight in the resin layer on the shaft sliding surface. On the other hand, the bearing wear loss gradually decrease with increasing PTFE content in the resin layer on the bearing sliding surface. Comparative Example 6 is a case containing 85% by weight of PTFE in the resin layer on the shaft sliding surface and shows a considerably large shaft wear loss such as 20 $\mu$m.

Examples 1 to 5 each contain 15% by weight of PTFE in the resin layer on the bearing sliding surface in contrast to Examples 6 to 8 and show a much lower coefficient of friction. Furthermore, both shaft and bearing wear losses are smaller and the effect of PTFE contained in the resin layer on the bearing sliding surface is remarkable. The coefficient of friction gradually lowers with increasing PTFE content in the resin layer on the shaft sliding surface, whereas the shaft wear loss does not change so remarkably against changing PTFE content from 10 to 50% by weight in the resin layer on the shaft sliding surface, where the shaft wear loss of Examples 2 and 3 are 4 $\mu$m as a minimum. On the other hand, the bearing wear loss of Examples 3, 4 and 5 is 2 $\mu$m as a minimum. Comparative Example 7 is a case containing 85% by weight of PTFE in the resin layer on the shaft sliding surface and shows a considerably large shaft wear loss such as 19 $\mu$m.

Examples 9 to 11 each contain 30% by weight of PTFE in the resin layer on the bearing sliding surface in contrast to Examples 6 to 8 and show most distinguished coefficients of friction. The shaft wear loss does not change remarkably against changing PTFE content from 10 to 50% by weight in the resin layer on the shaft sliding surface and shows small values such as 5 $\mu$m and 6 $\mu$m. The bearing wear loss also shows small values such as 6 $\mu$m and 7 $\mu$m.

It can be seen from the foregoing test results that a coefficient of friction can be made smaller and the shaft and bearing wear resistances can be improved by making the resin layer on the shaft sliding surface from a resin composition comprising PAI (polyamideimide resin) and at least 5% by weight of PTFE on the basis of the total resin composition and making the resin layer on the bearing sliding surface from a resin composition comprising PEEK (polyether ether ketone resin) and not more than 30% by weight of PTFE on the basis of total resin composition.

Examples 12 and 13 are cases of using EP (epoxy resin) and PFA (tetrafluoroethylene-perfluoroalkylvinyl ether copolymer resin), respectively, for the resin layer on the shaft sliding surface in place of PAI of Example 3, and each show equivalent values for the coefficient of friction and the shaft and bearing wear losses.

Examples 15 and 16 are cases of using thermoplastic PI (polyimide resin) and PPS (polyphenylene sulfide resin), respectively, for the resin layer on the bearing sliding surface in place of PEEK of Example 3, and each show equivalent values for the coefficient of friction and the shaft and bearing wear losses.

Examples 17 to 20 are cases of adding 5 to 30% by weight of potassium titanate whiskers to the resin layer on the bearing sliding surface on the basis of the total resin composition, while keeping the PTFE content of 15% by weight constant in contrast to the resin layer comprising 85% by weight of PEEK and 15% by weight of PTFE on the bearing sliding surface of Example 2, and each show much better values for the coefficient of friction and the shaft and bearing wear losses.

Examples 21 to 24 are cases of adding PbO or $PbF_2$ to the resin layer on the bearing sliding surface on the basis of the total resin composition, while keeping the PTFE content of 15% by weight constant, in contrast to the resin layer on the bearing sliding surface of Example 18, and each show much better values for the coefficient of friction and the shaft and bearing wear losses.

EXAMPLE (Application to a continuously variable transmission)

An embodiment of applying the present invention to a dry type, continuously variable transmission will be described below:

FIG. 1 is a cross-sectional view of a belt-type, continuously variable transmission, where driving shaft 2 connected to an engine (not shown in the drawing) and driven shaft 3 connected to a wheel (not shown in the drawing) are rotatably mounted on casing 1, and driving pulley 20 is formed on driving shaft 2 whereas driven pulley 30 is formed on driven shaft 3. V belt 4 is entrained between pulley grooves on both pulleys 20 and 30. When driving shaft 2 is driven to rotate, driven shaft 3 is rotated in a transmission ratio corresponding to respective diameters of V belt 4 entrained pulleys 20 and 30.

Driving pulley 20 will be further explained below.

At the intermediate position of driving shaft 2 rotatably mounted on casing 1 is integrally provided fixed sheave 21, which can serve as a half of driving pulley 20. Slide key 22 is provided on driving shaft 2 as projected from the other periphery of the shaft body and cylindrical driving housing 23 is provided sliding in the axial direction, while fitted with slide key 22. Driving housing 23 is also rotatable together with driving shaft 2. On the inner periphery of driving housing 23 are provided bearings 24 at two positions around driving shaft 2 to support driving housing 23.

The outer periphery of driving housing 23 is fitted with the inner race ring of bearing 51 to allow driving housing 23 to rotate together with the inner race ring. On the other hand, the outer race ring of bearing 51 is fitted with slider gear 52 to allow the outer race ring to rotate together with slider gear 52.

Internal threads 52a are formed on the inner peripheral surface of slider gear 52 and are engaged with external threads 53a formed on screw shaft 53. The end of screw shaft 53 is fixed to casing 6, and bearing 54 is provided on the inside of screw shaft 53, and driving shaft 2 is rotatably supported on bearing 54.

Gear 52b is formed on the outer periphery of slider gear 52 and is engaged with small gear 55a on rotatably supported power transmission gear 55. On the other hand, large gear 55b on power transmission gear 55 is engaged with small gear 56a on power transmission gear 56, and large gear 56b on power transmission gear 56 is engaged with driving gear 57 on motor 5. Driving gear 57 is driven by motor 5. Rotation of motor 5 is transmitted to slider gear 52 through power transmission gears 56 and 55. Slider gear 52, when rotated, slides in the axial direction by threads 52a and 53a.

Thus, driving housing 23 is slidable in the axial direction of driving shaft 2 by rotation of motor 5. Movable sheave 25 serving as another half of driving pulley 20 is integrally provided on driving housing 23 at one end thereof. A V-shaped driving pulley groove is formed between the counterposed inclined surfaces of movable sheave 25 and fixed sheave 21. When motor 5 is started to rotate, driving housing 23 slides in the axial direction of driving shaft 2, whereby movable sheave 25 is slided to adjust the width of driving pulley groove.

Groove width-adjustable, V-shaped driving pulley groove can be provided in this manner by fixed sheave 21 on driving shaft 2 and movable sheeve 25 on driving housing 23. V belt 4 is then entrained between the V-shaped driving pulley groove and the driven pulley groove of driven pulley 30.

Driven pulley 30 will be further explained below.

Driven pulley 30 is substantially in the same structure as that of driving pulley 20. On driven shaft 3 mounted on casing 1 in parallel with driving shaft 2 is integrally provided fixed sheave 31 serving as a half of driven pulley 30 at the position corresponding to that of movable sheave 25 on driving pulley 20. Cylindrical driven housing 32, which is slidable in the axial direction of driven shaft 3, is provided on driven shaft 3, and is rotatable together driven shaft 3.

On the inner peripheral surface of driven housing 32 are provided bearings 33 at two positions around driven shaft 3 to support driven housing 32 and also to allow driven housing 32 to rotate with driven shaft 3 and slide in the axial direction of driven shaft 3.

Movable sheave 36 serving as another half of driven pulley 30 is integrally provided on driven housing 32 at one end, and a driven pulley groove is formed between the inclined surfaces of counterposed movable sheave 36 and fixed sheave 31. In FIG. 1, the right end surface of movable sheave 36 forms a torque-cam surface, and torque-cam 34, which can be engaged with the torque-cam surface, is provided on driven shaft 3. Driven housing 32 is pressed toward the left by a compression spring 35 inserted therebetween and the torque-cam mechanism, thereby generating a tension on V belt 4.

Movable sheave 25 on driving shaft 2 can be slided toward the left or the right in this manner, thereby broadening or narrowing the width of the driving pulley groove, and correspondingly the width of the driven pulley groove can be changed, i.e. broadened or narrowed by V belt 4 entrained therebetween, thereby changing the respective pulley diameter. That is, continuously variable transmission can be established between driving shaft 2 and driven shaft 3 thereby.

Bearings 24 provided on driving housing 23 will be further explained below.

Driving housing 23 rotates together with driving shaft 2 by engagement of slide key 22, but a very small clearance is provided between bearings 24 and driving shaft 2 to allow driving housing 23 to smoothly slide in the axial direction along driving shaft 2. The inner peripheral length of cylindrical bearings 24 is larger only by a length corresponding to the clearance than the outer peripheral length of driving shaft 2. On the other hand, driving housing 23 and driving shaft 2 rotate together by V belt 4, and thus bearings 24 produce a scroll motion on driving shaft 2. As a result, wear generates on the sliding surfaces of bearings 24 and driving shaft 2 due to frictions caused by the scroll motion.

To allow driving housing 23 to smoothly slide in the axial direction in the bearing structure of driving shaft 2 and bearings 24, it is required that the coefficient of friction is low and stable, wear losses of both driving shaft 2 and bearings 24 are small and the clearance is kept within an appropriate range.

Figure 2:
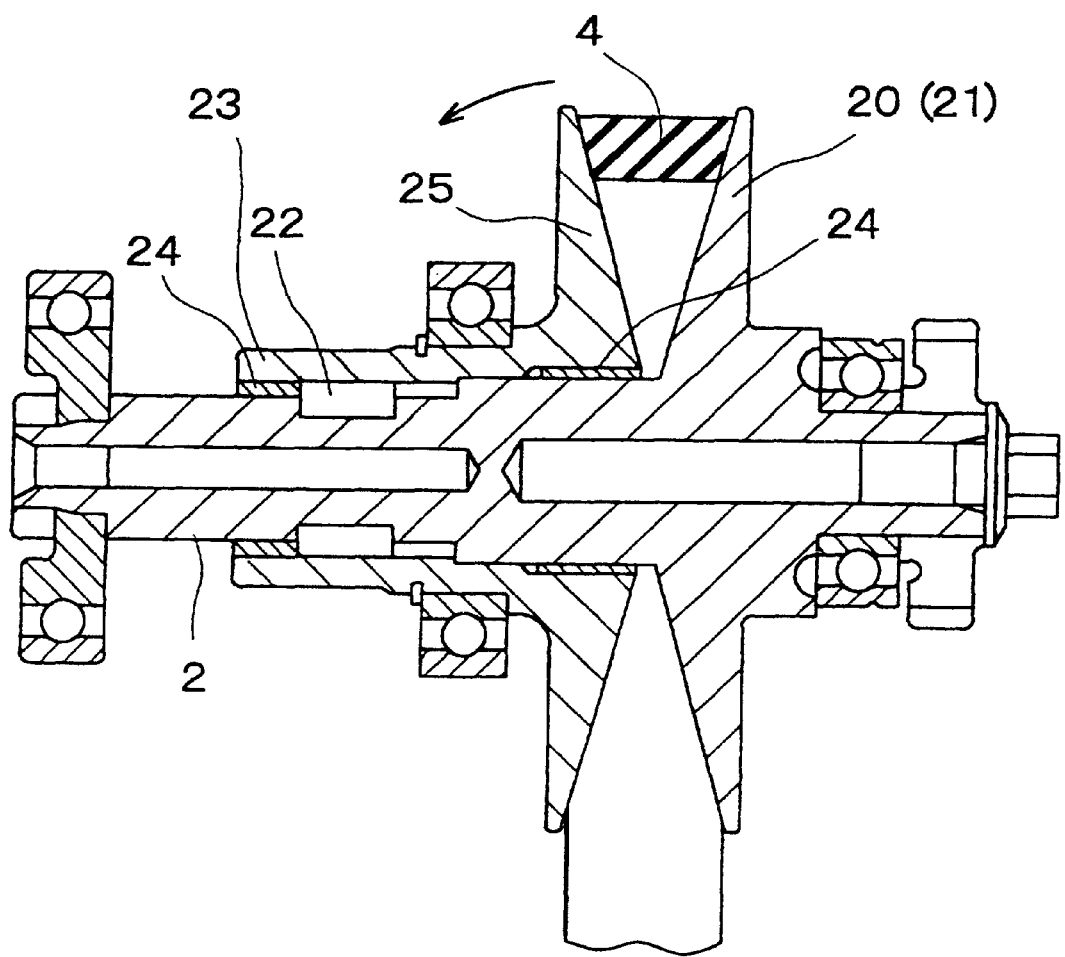
FIG. 2 is an enlarged cross-sectional view of the driving pulley region of the continuously variable transmission of FIG. 1.

As shown by arrow in FIG. 2, driving housing 23 is subject to a tilting force due to the tension on V belt 4, and consequently tends to slide on driving shaft 2 in a partial or one-side contact with bearings 24.

Bearings 33 provided on driven housing 32, which rotates together with driven shaft 3, produce a scroll motion on driven shaft 3 due to a difference in inner peripheral length caused by the clearance as in case of bearings 24 on driving housing 23. Consequently, wear generates on the sliding surfaces of bearings 33 and driven shaft 3 due to frictions caused by the scroll motion. That is, driven housing 32 tend to slide on driven shaft 3 in a partial or one-side contact with bearings 33 due to the tension on V belt 4, as in case of the bearing structure of driving shaft 2 and bearings 24.

The bearing structure of driving shaft 2 and bearings 24 and that of driven shaft 3 and bearings 33 were tested to determine their wear resistances. Test was carried out by a pulley bearing wear tester for a continuously variable transmission disclosed in JP-A 9(1997)-113429. The wear tester is a simulation tester capable of providing the same sliding conditions as these for actual transmissions. Test conditions were set as follows:

Revolution of driving shaft 2: 3,200 rpm

Revolution of driven shaft 3: 6,400 rpm

Interaxial force: 500 kgf

Clearances between shaft and bearing: 100 $\mu$m each wear loss was measured at an interval of 10 hours, and the time when the clearance reached 200 $\mu$m by wearing of the shafts and the bearing on the basis of the measurements, was regarded as endurance time, by which the wear resistance was judged. However, since wear loss was larger on the driven shaft than on the driving shaft, wear loss on the driven shaft was used as endurance time Test pieces were those consisting of shafts or bearings and resin layer of Examples 1 to 24 and Comparative Examples 1 to 11 given in Tables 1 and 2. That is, bearing test pieces were prepared, as in the same manner as mentioned before, by roll pressure-welding the resin composition onto a porous sintered layer, followed by cutting, formation of cylinders, 36 mm in inner diameter and 25 mm in width, and further cutting of inner surface by a general purpose lathe to enhance the dimensional precision. In this manner, bearing test pieces of Examples 1 to 24 and Comparative Examples 1 to 11 were obtained.

Shaft test pieces were prepared by spraying resin compositions of Examples 1 to 24 and Comparative Examples 1 to 7 in a band state, 40 mm in width, onto the outer periphery of a steel shaft, 36 mm in diameter, followed by heating to form a resin layer, 0.01 mm in thickness. Shaft test pieces of Examples 1 to 24 and Comparative Examples 1 to 7 were obtained thereby.

Results of endurance time on the driven shaft side obtained by the simulation test are shown in Table 3.

The test results show that good endurance was obtained in all the Examples, as compared with Comparative Examples 8 to 11 with no resin layer on the shaft sliding surface, and also as compared with Comparative Examples 1 to 4 with no PTFE in the resin layer on the shaft sliding surface.

What is claimed is:

1. A bearing structure, which comprises a shaft and a bearing for supporting the shaft, the shaft and the bearing having a resin layer formed on the respective sliding surfaces, the resin layer on the shaft sliding surface being made from a resin composition comprising at least one member selected from the group consisting of epoxy resin, phenol resin, polyamideimide resin, polyimide resin, polyacetal resin, polyamide resin, polyphenylene sulfide resin, polyether ether ketone resin and tetrafluoroethylene-perfluoroalkylvinyl ether copolymer resin and 5 to 50% by weight of polytetrafluoroethylene based on total resin composition, and the resin layer on the bearing sliding surface being made from at least one member selected from the group consisting of epoxy resin, phenol resin, polyamideimide resin, polyimide resin, polyacetal resin, polyamide resin, polyphenylene sulfide resin, polyether ether ketone resin, tetrafluoroethyleneperfluoro-alkylvinyl ether copolymer resin and not more than 50% by weight of polytetrafluoroethylene based on total resin composition.

2. A bearing structure according to claim 1, wherein the resin layer on the shaft sliding surface is made from a thermosetting resin and the resin layer on the bearing sliding surface is made from a thermoplastic resin.

3. A bearing structure according to claim 1 or 2, wherein the resin layer on the bearing sliding surface contains 5 to 30% by weight of potassium titanate whiskers based on total resin composition.

4. A bearing structure according to claim 1, 2 or 3, wherein the resin layer on the bearing sliding surface contains 0.1 to 10% by weight of a lead compound, based on total resin composition.

5. A continuously variable transmission having a bearing structure according to claim 4.

6. A continuously variable transmission having a bearing structure according to claim 2.

7. A bearing structure according to claim 2, wherein the resin layer on the bearing sliding surface contains 0.1 to 10%, by weight of a lead compound, based on total resin composition.

8. A continuously variable transmission having a bearing structure according to claim 7.

9. A continuously variable transmission having a bearing structure according to claim 3.

10. A continuously variable transmission having a bearing structure according to claim 1.

11. A bearing structure according to claim 1, wherein the resin layer on the bearing sliding surface contains 0.1 to 10% by weight of a lead compound, based on total resin composition.

12. A continuously variable transmission having a bearing structure according to claim 11.

13. A bearing structure according to claim 1, wherein the resin layer on the bearing sliding surface contains 5 to 30% by weight of potassium titanate whiskers based on total resin composition.

14. A bearing structure according to claim 13, wherein the resin layer on the bearing sliding surface contains 0.1 to 10% by weight of a lead compound, based on total resin composition.

15. A continuously variable transmission having a bearing structure according to claim 14.

* * * * *